(12) United States Patent
Chen (10) Patent No.: US 12,133,045 B2
(45) Date of Patent: Oct. 29, 2024

(54) CAMERA WITH ACCUMULATED WATER TREATMENT FUNCTION AND METHOD OF TREATING ACCUMULATED WATER THEREOF

(71) Applicant: CHICONY ELECTRONICS CO., LTD., New Taipei (TW)

(72) Inventor: Chien-Yueh Chen, New Taipei (TW)

(73) Assignee: CHICONY ELECTRONICS CO., LTD., New Taipei (TW)

(*) Notice: Subject to any disclaimer, the term of this patent is extended or adjusted under 35 U.S.C. 154(b) by 206 days.

(21) Appl. No.: 17/867,075

(22) Filed: Jul. 18, 2022

(65) Prior Publication Data

US 2023/0209246 A1    Jun. 29, 2023

(30) Foreign Application Priority Data

Dec. 29, 2021  (TW) .................................. 110149428

(51) Int. Cl.
*H04R 1/26*  (2006.01)
*H04N 23/52* (2023.01)

(52) U.S. Cl.
CPC .............. *H04R 1/26* (2013.01); *H04N 23/52* (2023.01)

(58) Field of Classification Search
CPC . H04R 1/028; H04R 1/26; H04R 1/02; H04R 1/04; H04R 3/00; H04R 3/005; H04R 3/12; H04R 2499/11; H04N 5/225; H04N 23/52; H04N 23/57

USPC .......................................................... 381/182
See application file for complete search history.

(56) References Cited

U.S. PATENT DOCUMENTS

| | | | |
|---|---|---|---|
| 2014/0294196 A1* | 10/2014 | An ......................... | H04R 3/005 381/92 |
| 2018/0175815 A1* | 6/2018 | Ohtsuka ................... | H04R 3/00 |
| 2020/0379724 A1* | 12/2020 | Kim ........................ | G06F 3/165 |
| 2021/0084405 A1* | 3/2021 | Tisch ...................... | H04R 3/005 |

FOREIGN PATENT DOCUMENTS

JP         2021122093 A  *  8/2021  ............. H04R 27/00

* cited by examiner

*Primary Examiner* — Paul Kim
(74) *Attorney, Agent, or Firm* — Muncy, Geissler, Olds & Lowe, P.C.

(57) ABSTRACT

A camera with an accumulated water treatment function and a method of treating accumulated water thereof are disclosed. The camera includes a main body, a processing module, an image capturing module, a speaker, a first microphone, and a second microphone. The processing module has an image processing unit and an audio processing unit. The image capturing module is used for capturing an environmental image. The first microphone and the speaker are arranged on different sides of the main body. The second microphone and the first microphone are arranged on different sides of the main body. The audio processing unit controls the speaker to broadcast a first audio file and uses the first microphone or the second microphone to record to generate a second audio file so as to determine the difference between the second audio file and a first preset audio file.

20 Claims, 8 Drawing Sheets

CAMERA WITH ACCUMULATED WATER TREATMENT FUNCTION AND METHOD OF TREATING ACCUMULATED WATER THEREOF

1. FIELD OF THE INVENTION

The present invention relates generally to a camera with an accumulated water treatment function and a method of treating accumulated water thereof, and more particularly, to a camera with an accumulated water treatment function and a method of treating accumulated water thereof that can be used for broadcasting an audio file to determine and process the accumulated water.

2. Description of the Related Art

With the advancement of technology, the present outdoor camera no longer simply records images. It can also use a microphone to record sound or use a speaker to broadcast sound. An outdoor camera can be installed with the speaker holes of the camera facing upward or downward. In a rainy environment, the quality of broadcasting of the speaker or the quality of sound reception of the microphone of the outdoor camera may be affected by the problem of water accumulation.

Therefore, it is necessary to provide a new camera with an accumulated water treatment function and a method of treating accumulated water thereof to solve the problems of the prior art.

SUMMARY OF THE INVENTION

It is a main object of the present invention to provide a camera with an accumulated water treatment function, which can be used for broadcasting an audio file to determine and process the accumulated water.

It is another object of the present invention to provide a method of treating accumulated water used in the abovementioned camera.

To achieve the abovementioned objects, the camera with an accumulated water treatment function of the present invention comprises a main body, a processing module, an image capturing module, a speaker, a first microphone, and a second microphone. The processing module is arranged inside of the main body and has an image processing unit and an audio processing unit. The image capturing module is coupled to the processing module to capture an environmental image. The speaker is coupled to the processing module, wherein the audio processing unit generates a first audio file to be broadcasted from the speaker. The first microphone is coupled to the processing module and arranged on a side of the main body different from that of the speaker. The second microphone is coupled to the processing module and arranged on a side of the main body different from that of the first microphone, wherein the first microphone or the second microphone is used to receive the first audio file to obtain a second audio file and the audio processing unit is used to compare the second audio file with a first preset audio file.

The method of treating accumulated water of the present invention comprises the following steps: generating a first audio file to be broadcasted from a speaker; receiving the first audio file by a first microphone or a second microphone to obtain a second audio file, wherein the first microphone is arranged on a side of the main body different from that of the speaker and the second microphone is arranged on a side of the main body different from that of the first microphone; comparing the second audio file with a first preset audio file; and controlling the speaker to stop broadcasting the first audio file when the difference between the second audio file and the first preset audio file is less than a threshold.

Another method of treating accumulated water of the present invention comprises the following steps: generating a first audio file to be broadcasted from a speaker; receiving the first audio file by a first microphone to obtain a second audio file, wherein the first microphone is arranged on a side of the main body different from that of the speaker; comparing the second audio file with a first preset audio file; controlling a second microphone to receive the first audio file so as to obtain a third audio file when the difference between the second audio file and the first preset audio file is less than a threshold, wherein the second microphone is arranged on a side of the main body different from that of the first microphone; and comparing the third audio file with a second preset audio file.

DETAILED DESCRIPTION OF THE PREFERRED EMBODIMENTS

In order to make the structure and characteristics as well as the effectiveness of the present invention further understood and recognized, the detailed description of the present invention is provided as follows along with embodiments and accompanying figures.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
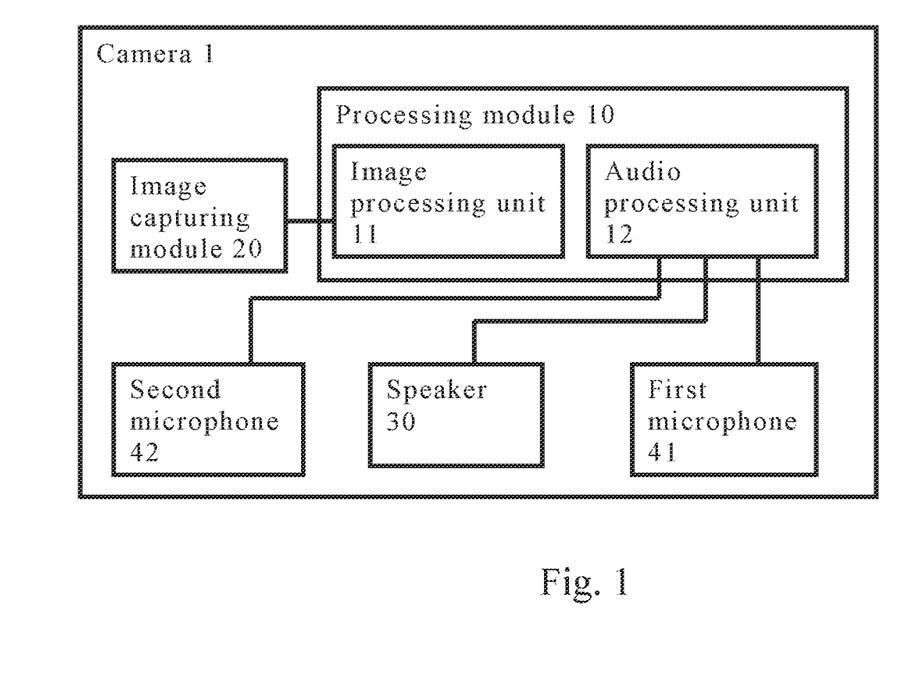
FIG. 1 illustrates a structural view of a camera of the present disclosure.

Please refer to FIG. 1 for a structural view of a camera of the present disclosure.

Figure 2A:
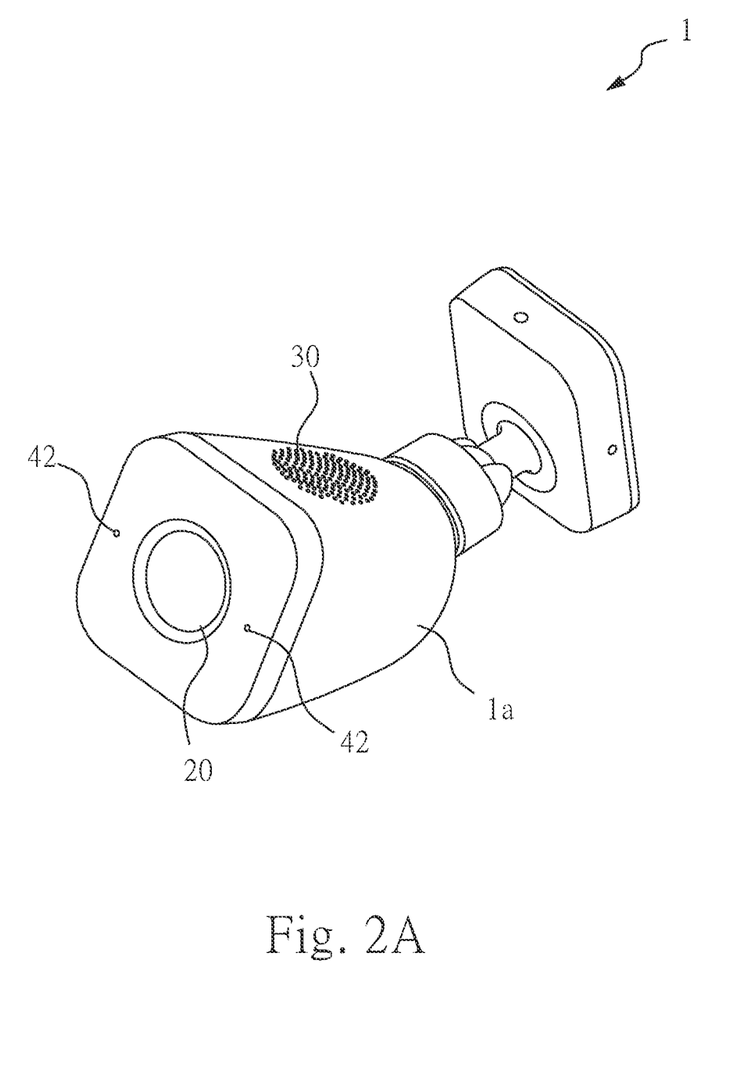
FIG. 2A illustrates a view showing the appearance of the camera of the present disclosure.

In one embodiment of the present disclosure, a camera 1 may be set in an outdoor environment. However, when the camera 1 is placed in the outdoor environment, rainwater may accumulate in part of the structure of the camera 1. The camera 1 of the present disclosure has an accumulated water treatment function in order to reduce the effect of the accumulated water on the quality of the image capturing, sound reception or broadcasting. The camera 1 comprises a main body 1a (as shown in FIG. 2A), a processing module 10, an image capturing module 20, a speaker 30, a first microphone 41, and a second microphone 42, but the camera 1 of the present invention is not limited to having only the above-mentioned components or modules. The processing module 10 is arranged inside of the main body 1a and has an image processing unit 11 and an audio processing unit 12. The image processing unit 11 is configured to perform image processing on the image captured by the camera 1 by using an algorithm. The audio processing unit 12 is configured to perform audio processing on the audio signal received or to be broadcasted from the camera 1. The present invention does not limit the image or audio formats that can be processed or generated by the image processing unit 11 and the audio processing unit 12.

Figure 2B:
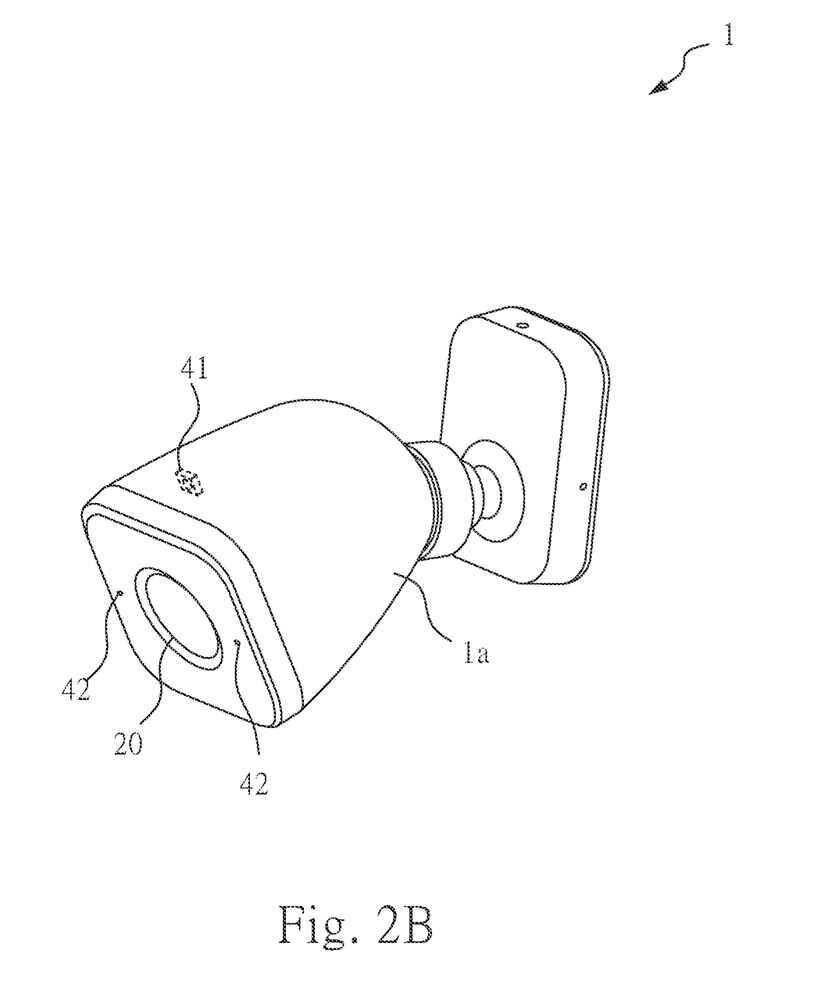
FIG. 2B illustrates a view showing the appearance of another use state of the camera of the present disclosure.

Please refer to FIG. 2A for a view showing the appearance of the camera of the present disclosure and FIG. 2B for a view showing the appearance of another use state of the camera of the present disclosure.

The image capturing module 20 is arranged on one side of the main body 1a and comprises a CCD module or a CMOS module for capturing an environmental image. The image capturing module 20 is coupled to the image processing unit 11 of the processing module 10 so that the captured environmental image can be transmitted to the image processing unit 11 for processing. Since the technique of capturing images is commonly applied by those skilled in the art and is not the focus of improvement of the present invention, there is no need for further explanation. The speaker 30 is arranged on one side of the main body 1a, and the speaker 30 can also be arranged on the same side as or on a different side from the image capturing module 20; the arrangement is not limited in the present invention. The speaker 30 is coupled to the audio processing unit 12 of the processing module 10 to broadcast the audio file generated by the audio processing unit 12. The first microphone 41 is coupled to the processing module 10 and arranged on a side of the main body 1a different from that of the speaker 30. Therefore, when it rains, the first microphone 41 and the speaker 30 will not be affected by the rain at the same time; that is, the first microphone 41 and the speaker 30 will not accumulate water at the same time. The second microphone 42 is coupled to the processing module 10. The second microphone 42 can be arranged on the same side of the main body 1a as the image capturing module 20, but the second microphone 42 is arranged on a side of the main body 1a different from that of the first microphone 41. Therefore, the first microphone 41 and the second microphone 42 will not be affected by the rain at the same time; that is, the first microphone 41 and the second microphone 42 will not accumulate water at the same time. The first microphone 41 and the second microphone 42 may be the same or different specifications and models, and the present invention is not limited thereto.

It should be noted that the second microphone 42 and the speaker 30 can be arranged on the same side or on different sides of the main body 1a. The present invention does not limit whether the second microphone 42 and the speaker 30 will be affected by rain at the same time. The key design factor is that the first microphone 41 and the speaker 30, and the first microphone 41 and the second microphone 42, must not be affected by rain at the same time. Please refer to FIG. 2A, which illustrates the first use state of the camera 1 (for example, the user communicates with a remote operator through the camera 1), and FIG. 2B, which illustrates the second use state of the camera 1 (for example, the user uses the camera 1 for broadcasting). In one embodiment of the present disclosure, the speaker 30 is arranged on the upper side of the main body 1a, the image capturing module 20 and the second microphone 42 are arranged on the front side of the main body 1a, and the first microphone 41 is arranged on the lower side of the main body 1a, which is the side opposite that of the speaker 30. In other embodiments not shown in the figures, the first microphone 41 may be arranged on a side adjacent to that of the speaker 30.

The present invention does not limit the number of the first microphones 41, either. Please refer to FIG. 2C for a view showing the appearance of another embodiment of the camera of the present disclosure.

Figure 2C:
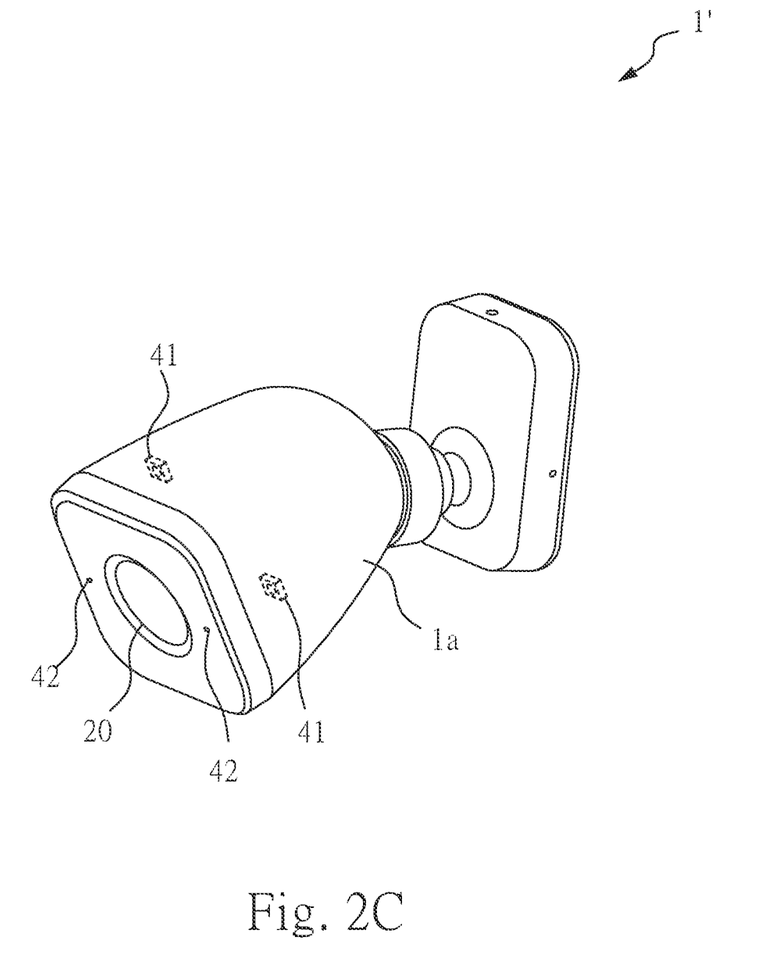
FIG. 2C illustrates a view showing the appearance of another embodiment of the camera of the present disclosure.

In another embodiment, the camera 1' includes a plurality of first microphones 41. The first microphones 41 are respectively arranged on different sides of the main body 1a. Therefore, when the camera 1' is turned to different angles, it can be ensured that at least one of the first microphones 41 will not be affected by rain or accumulated water.

The image processing unit 11 of the processing module 10 uses the environmental image captured by the image capturing module 20 to determine whether it is raining. When the camera 1 is in the first use state shown in FIG. 2A and it is raining, since the speaker 30 is arranged on the upper side of the main body 1a and the second microphone 42 is arranged on the front side of the main body 1a, it can be determined that both the speaker 30 and the second microphone 42 are affected by rain and have accumulated water. In this case, the audio processing unit 12 of the processing module 10 generates a first audio file with a low frequency to be broadcasted via the speaker 30, and then the first microphone 41 or the second microphone 42 receives the first audio file broadcasted via the speaker 30 to obtain a second audio file. The first audio file is a low-frequency audio file that cannot be heard by humans; for example, the frequency of the first audio file is less than or equal to 20 Hz, but the present invention is not limited to this range. At this time, the speaker 30 can also use a vibration generated by broadcasting the first audio file of the low frequency to eliminate the accumulated water of the speaker 30. The first audio file is a low-power audio file; for example, the power is one tenth of the usual power so as to avoid causing structural damage to the speaker 30. The audio processing unit 12 is configured to determine the difference between the second audio file and a first preset audio file. When the difference between the second audio file and the first preset audio file is less than a threshold, the audio processing unit 12 controls the speaker 30 to stop broadcasting the first audio file. Furthermore, the first preset audio file is obtained by the audio processing unit 12 using the first microphone 41 to record while using the speaker 30 to broadcast the first audio file when the camera 1 has no accumulated water. For example, in the absence of rain, the first preset audio file is obtained after the camera 1 is first installed at a fixed position in the environment that the user wants to monitor. In addition, the audio processing unit 12 can control the speaker 30 to broadcast the first audio file and control the second microphone 42 to record to obtain the second preset audio file when the camera 1 has no accumulated water.

In one embodiment of the present invention, the image processing unit 11 of the processing module 10 uses the environmental image captured by the image capturing module 20 to determine whether the camera 1 is in the first use state, shown in FIG. 2A. Specifically, the image processing unit 11 of the processing module 10 detects whether the environmental image is turned upward or downward so as to determine whether the camera 1 is in the first use state shown in FIG. 2A or in the second use state shown in FIG. 2B.

In one embodiment of the present invention, when the camera 1 is in the first use state shown in FIG. 2A and it is raining, then since the first microphone 41 is arranged on the lower side of the main body 1a, it can be determined that the first microphone 41 is not affected by the rain and has not accumulated water. In this case, the audio processing unit 12 of the processing module 10 generates a first audio file with a low frequency to be, and then the first microphone 41 without accumulated water receives the first audio file broadcasted via the speaker 30 to obtain a second audio file.

In one embodiment of the present invention, the first audio file is a low-frequency audio file that cannot be heard by humans; for example, the frequency of the first audio file is less than or equal to 100 Hz, but the present invention is not limited to this range.

The above-mentioned threshold can be defined as the degree to which the difference between the second audio file and the first preset audio file or the second preset audio file is not perceptible to normal human hearing. To this degree, the output sound broadcasted from the speaker 30 and the input sound received by the second microphone 42 are not affected by the accumulated water; that is, the broadcast quality of the speaker 30 and the sound reception quality of the second microphone 42 are very close to normal.

Figure 3:
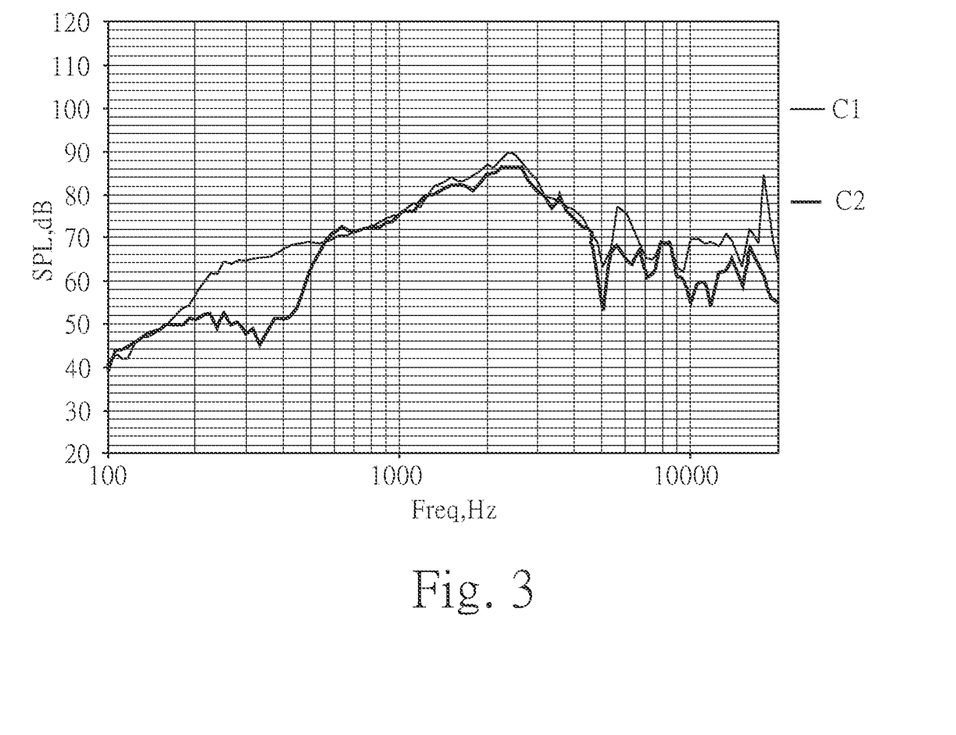
FIG. 3 illustrates a graph showing the frequency response of the sound broadcast from the speaker in the accumulated water state and the non-accumulated water state of the present disclosure.
Figure 4:
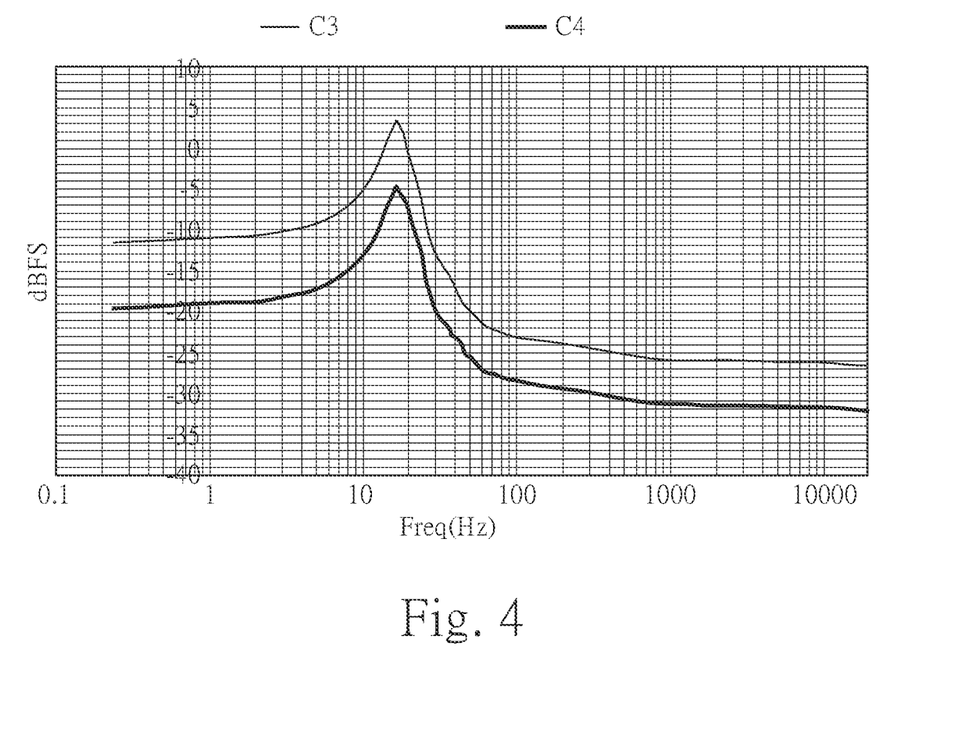
FIG. 4 illustrates a graph showing the frequency response of the sound reception of the microphone in the accumulated water state and in the non-accumulated water state of the present disclosure.

Please refer to FIG. 3 for a graph showing the frequency response of the sound broadcasting from the speaker of the present disclosure in the accumulated water state and in the non-accumulated water state, and please also refer to FIG. 4 for a graph showing the frequency response of the sound reception of the microphone of the present disclosure in the accumulated water state and in the non-accumulated water state.

In FIG. 3, the first curve C1 represents the frequency response curve of the speaker 30 broadcasting the output sound in the non-accumulated water state, and the second curve C2 represents the frequency response curve of the speaker 30 broadcasting the same output sound in the accumulated water state. In FIG. 4, the third curve C3 represents the frequency response curve of the second microphone 42 receiving the input sound in the non-accumulated water state, and the fourth curve C4 represents the frequency response curve of the second microphone 42 receiving the same input sound in the accumulated water state. Therefore, from the difference between the first curve C1 and the second curve C2 in FIG. 3, and from the difference between the third curve C3 and the fourth curve C4 in FIG. 4, it can be known that the output sound broadcasted from the speaker 30 and the input sound received by the second microphone 42 will be affected in the accumulated water state.

In addition, the audio processing unit 12 can also adjust the speaker 30 at this time. The audio processing unit 12 adjusts an equalization value of the output sound broadcasted from the speaker 30 according to the difference between the second audio file and the first preset audio file as the basis for adjusting the second curve C2. Thus, the second curve C2 in the accumulated water state will be adjusted to the first curve C1 in the non-accumulated water state so as to reduce the distortion of the output sound. At the same time, the audio processing unit 12 can also adjust the second microphone 42. The audio processing unit 12 adjusts an equalization value of the input sound received by the second microphone 42 according to the difference between the second audio file and the second preset audio file, e.g., according to the difference between the fourth curve C4 and the third curve C3, as the basis for adjusting the fourth curve fourth curve C4. Thus, the fourth curve C4 in the accumulated water state will be adjusted to the third curve C3 in the non-accumulated water state so as to reduce the distortion of the input sound.

The audio processing unit 12 can adjust the speaker 30 and the second microphone 42 at the same time. For example, the audio processing unit 12 controls the speaker 30 to broadcast the first audio file and controls the second microphone 42 to receive the first audio file to obtain a second audio file, and the equalization adjustment is performed on the speaker 30 and the second microphone 42 at the same time according to the difference between the second audio file and the second preset audio file. The audio processing unit 12 can also perform the equalization adjustment successively. For example, the broadcasting function of the speaker 30 may be enabled first; thus, the second audio file obtained by the first microphone 41 is used to adjust the speaker 30. After the accumulated water state of the speaker 30 is eliminated, the function of the second microphone 42 is enabled; thus, the audio processing unit 12 adjusts the second microphone 42 by using the second audio file obtained by the second microphone 42. The entire processing flow is not completed until the accumulated water state of the second microphone 42 is eliminated.

Figure 5:
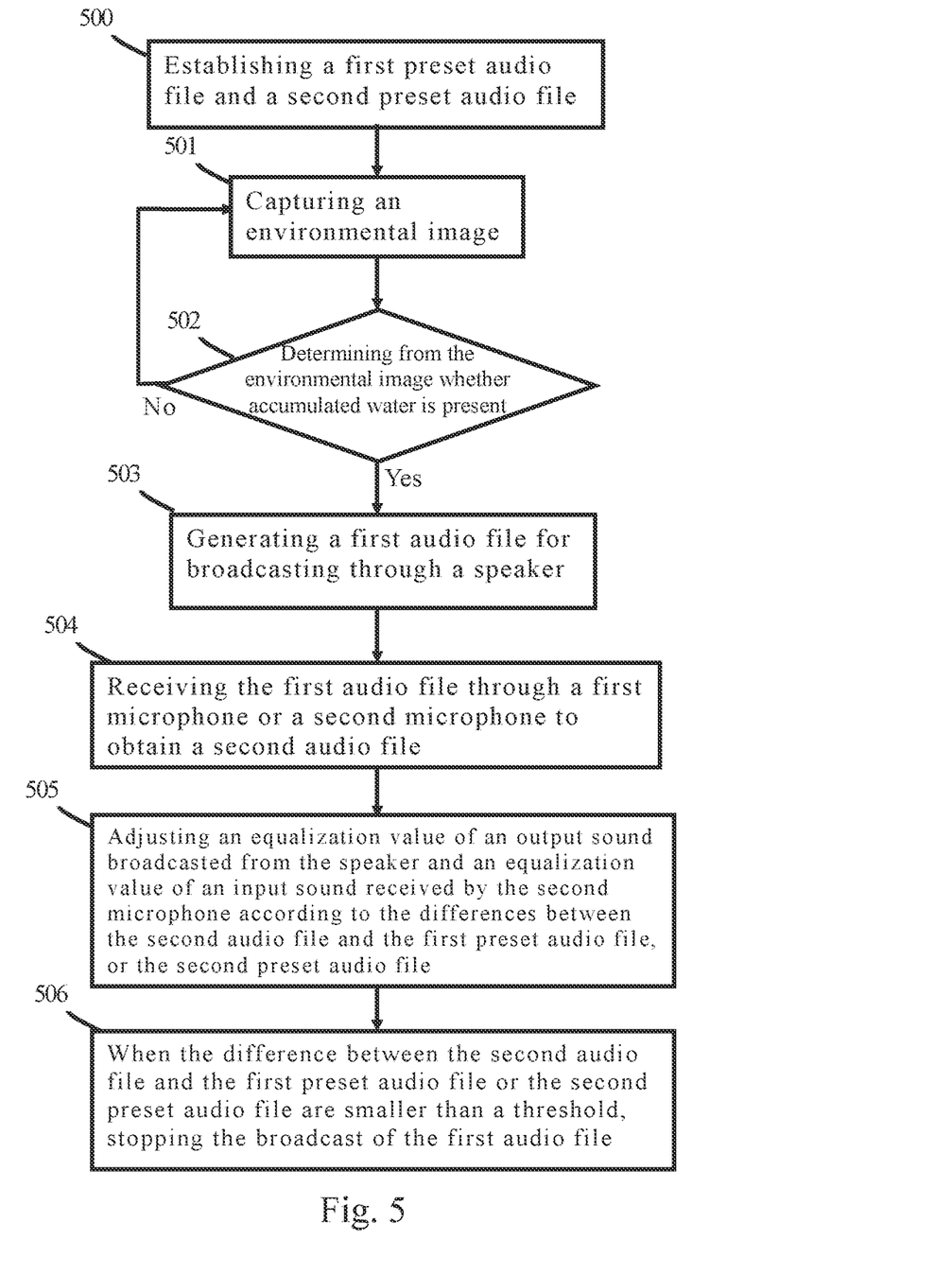
FIG. 5 illustrates a flow chart of the method of treating accumulated water of the first embodiment of the present disclosure.

Next, please refer to FIG. 5, which illustrates a flow chart of the method of treating accumulated water of the first embodiment of the present disclosure. Please note that the abovementioned camera 1 is simply used as an example for explaining the method of treating accumulated water according to the present invention; the method of treating accumulated water of the present invention is not limited to application in a camera 1 having exactly the same structure.

First, the method performs step 500: establishing a first preset audio file and a second preset audio file.

First, the audio processing unit 12 will control the speaker 30 to broadcast the first audio file under the non-accumulated water state and control the first microphone 41 to record so as to establish a first preset audio file. Furthermore, the audio processing unit 12 controls the second microphone 42 to record to establish a second preset audio file.

Then the method performs step 501: capturing an environmental image.

The image capturing module 20 captures an environmental image at any time and transmits it to the image processing unit 11 of the processing module 10.

Next, the method performs step 502: determining from the environmental image whether accumulated water is present.

The image processing unit 11 of the processing module 10 determines from the environmental image whether it is raining and confirms whether the speaker 30, the first microphone 41, and the second microphone 42 have accumulated water or not. Since the speaker 30, the first microphone 41, and the second microphone 42 are separately arranged on different sides of the main body 1a, the water will not accumulated at all of the speaker 30, the first microphone 41, and the second microphone 42 at the same time. The image processing unit 11 can use the environmental image to determine which side of the main body 1a of the camera 1 is facing upwards so as to determine whether the speaker 30 or the second microphone 42 has accumulated water. If the camera 1 is in the first use state shown in FIG.

2B, it can be determined that the speaker 30 or the second microphone 42 has no accumulated water, and the method can return to step 501.

If the image processing unit 11 determines that there is accumulated water, the method performs step 503: generating a first audio file for broadcasting through a speaker.

In this step, the audio processing unit 12 generates the first audio file to be broadcasted by the speaker 30.

Then the method performs step 504: receiving the first audio file through a first microphone or a second microphone to obtain a second audio file.

The first audio file broadcasted from the speaker 30 is then received by the first microphone 41 or the second microphone 42, and the second audio file can be obtained.

Then the method performs step 505: adjusting an equalization value of an output sound broadcasted from the speaker and an equalization value of an input sound received by the second microphone according to the differences between the second audio file and the first preset audio file or the second preset audio file.

In this step, the audio processing unit 12 will continue to determine the difference between the second audio file and the first preset audio file so as to adjust an equalization value of an output sound broadcasted from the speaker 30 based on the difference between the second audio file and the first preset audio file, or the audio processing unit 12 will continue to determine the difference between the second audio file and the second preset audio file so as to adjust an equalization value of an input sound received by the second microphone 42 based on the difference between the second audio file and the second preset audio file.

Finally, the method performs step 506: when the difference between the second audio file and the first preset audio file or the second preset audio file are smaller than a threshold, stopping the broadcast of the first audio file.

Step 505 will be continued until the difference between the second audio file and the first preset audio file is smaller than the threshold value, and then the adjustment of the equalization value of the speaker 30 will be stopped, or when the difference between the second audio file and the second preset audio file is smaller than the threshold, the adjustment of the equalization value of the second microphone 42 will be stopped. At this time, the speaker 30 and the second microphone 42 have not been affected by the accumulated water. Therefore, the audio processing unit 12 can control the speaker 30 to stop broadcasting the first audio file so as to end the method of treating accumulated water.

Figure 6:
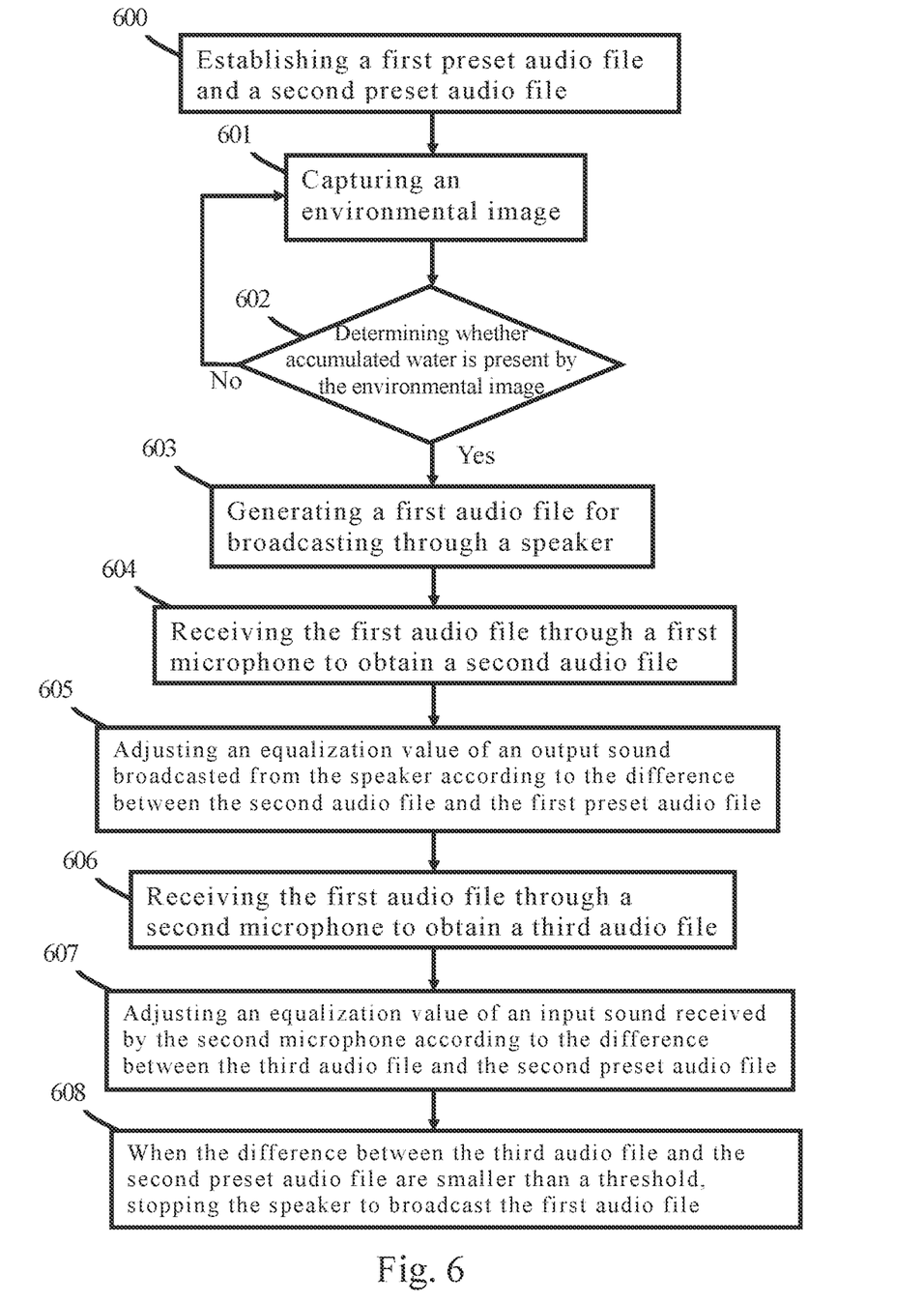
FIG. 6 illustrates a flow chart of the method of treating accumulated water of the second embodiment of the present disclosure.

Then please refer to FIG. 6 for a flow chart of the method of treating accumulated water of the second embodiment of the present disclosure.

First, the method performs step 600: establishing a first preset audio file and a second preset audio file, step 601: capturing an environmental image, step 602: determining whether accumulated water is present by the environmental image, and step 603: generating a first audio file for broadcasting through a speaker.

Since the above-mentioned steps 600 to 603 are the same as steps 500 to 503, there is no need for further explanation.

Then the method performs step 604: receiving the first audio file through a first microphone to obtain a second audio file.

The first audio file broadcasted from the speaker 30 is then received by the first microphone 41, which is not in the accumulated water state, and the second audio file can be obtained. Since the first microphone 41 has no accumulated water, the received sound will not be distorted by the influence of accumulated water.

Then the method performs step 605: adjusting an equalization value of an output sound broadcasted from the speaker according to the difference between the second audio file and the first preset audio file.

In this step, the audio processing unit 12 will continue to determine the difference between the second audio file and the first preset audio files so as to adjust an equalization value of an output sound broadcasted from the speaker 30 based on the difference between the second audio file and the first preset audio file. Step 605 will be continued until the difference between the second audio file and the first preset audio file is smaller than the threshold value, and then the adjustment of the equalization value of the speaker 30 will be stopped. At this time, the speaker 30 is not affected by accumulated water.

Then the method performs step 606: receiving the first audio file through a second microphone to obtain a third audio file.

Once the speaker 30 is not affected by the accumulated water, the audio processing unit 12 will continue to control the speaker 30 to broadcast the first audio file so that the second microphone 42 with accumulated water can obtain the third audio file.

Then the method performs step 607: adjusting an equalization value of an input sound received by the second microphone according to the difference between the third audio file and the second preset audio file.

In this step, the audio processing unit 12 will continue to determine the difference between the third audio file received by the second microphone 42 and the second preset audio file so as to adjust an equalization value of an input sound received by the second microphone 42 based on the difference between the third audio file and the second preset audio file.

Finally, the method performs step 608: when the difference between the third audio file and the second preset audio file are smaller than a threshold, stopping the speaker to broadcast the first audio file.

Step 607 will be continued until the difference between the third audio file and the second preset audio file is smaller than the threshold, and then the adjustment of the equalization value of the second microphone 42 will be stopped. After step 603 to step 607, the speaker and the second microphone 42 will not be affected by accumulated water. Therefore, the audio processing unit 12 can control the speaker to stop broadcasting the first audio file so as to end the method of treating accumulated water.

Please note that the method of treating accumulated water of the present invention is not limited to the stated order of the above steps. The execution order of the abovementioned steps can be altered as long as the object of the present invention can be achieved. In an exemplary embodiment, after step 603, the method performs step 606 of receiving the first audio file through a second microphone to obtain a third audio file, and then performs step 607 of adjusting an equalization value of an input sound received by the second microphone according to the difference between the third audio file and the second preset audio file first. Once the second microphone 42 is not affected by the accumulated water, the method performs step 604 and then step 605. Instead of step 608, the method performs the step of when the difference of the second audio file and the first preset audio file are smaller than a threshold, stopping the speaker to broadcast the first audio file.

Therefore, the camera 1 can adjust the input sound or the output sound at any time according to whether water has accumulated or not so as to effectively solve the deficiencies of the prior art.

Although the invention has been described with reference to the above embodiments, it will be apparent to one of ordinary skill in the art that modifications to the described embodiments may be made without departing from the spirit of the invention. Accordingly, the scope of the invention will be defined by the attached claims rather than by the above detailed descriptions.

What is claimed is:

1. A camera with an accumulated water treatment function, comprising:
    a main body;
    a processing module, arranged inside of the main body and having an image processing unit and an audio processing unit;
    an image capturing module, coupled to the processing module and configured to capture an environmental image;
    a speaker, coupled to the processing module, wherein the audio processing unit generates a first audio file to be broadcasted from the speaker;
    a first microphone, coupled to the processing module and arranged on a side of the main body different from that of the speaker; and
    a second microphone, coupled to the processing module and arranged on a side of the main body different from that of the first microphone, wherein the first microphone or the second microphone is configured to receive the first audio file to obtain a second audio file and the audio processing unit is configured to determine a difference between the second audio file and a first preset audio file;
    wherein the first preset audio file is the first audio file received by the first microphone in a non-accumulated water state; when the difference between the second audio file received by the first microphone or second microphone and the first preset audio file exceeds a threshold, the speaker broadcasts the first audio file so as to cause vibrations which eliminate the accumulated water.

2. The camera with the accumulated water treatment function as claimed in claim 1, wherein when the difference between the second audio file obtained by the first microphone or the second microphone and the first preset audio file is greater than a threshold value, the audio processing unit adjusts an equalization value of an output sound broadcasted from the speaker based on the difference between the second audio file and the first preset audio file.

3. The camera with the accumulated water treatment function as claimed in claim 2, wherein when the difference between the second audio file obtained by the second microphone and a second preset audio file is greater than a threshold value, the audio processing unit adjusts an equalization value of an input sound received by the second microphone based on the difference between the second audio file and the second preset audio file.

4. The camera with the accumulated water treatment function as claimed in claim 3, wherein when the camera is in a non-accumulated water state, the audio processing unit controls the speaker to broadcast the first audio file and controls the second microphone to record so as to establish the second preset audio file.

5. The camera with the accumulated water treatment function as claimed in claim 1, wherein when the camera is in a non-accumulated water state, the audio processing unit controls the speaker to broadcast the first audio file and controls the first microphone to record so as to establish the first preset audio file.

6. The camera with the accumulated water treatment function as claimed in claim 1, wherein the first audio file is a low-frequency audio file.

7. The camera with the accumulated water treatment function as claimed in claim 1, wherein the image processing unit determines whether accumulated water is present according to the environmental image.

8. A method of treating accumulated water, used for a camera, the method comprising the following steps:
    generating a first audio file to be broadcasted from a speaker;
    receiving the first audio file by a first microphone or a second microphone to obtain a second audio file, wherein the first microphone is arranged on a side of the main body different from that of the speaker and the second microphone is arranged on a side of the main body different from that of the first microphone;
    comparing the second audio file with a first preset audio file; wherein the first preset audio file is the first audio file received by the first microphone in a non-accumulated water state; when the difference between the second audio file received by the first microphone or second microphone and the first preset audio file exceeds a threshold, broadcasting the first audio file by the speaker so as to cause vibrations which eliminate the accumulated water; and
    controlling the speaker to stop broadcasting the first audio file when the difference between the second audio file and the first preset audio file is less than a threshold.

9. The method of treating accumulated water as claimed in claim 8, further comprising the step of adjusting an equalization value of an output sound broadcasted from the speaker based on the difference between the second audio file and the first preset audio file when the difference between the second audio file obtained by the first microphone or the second microphone and the first preset audio file is greater than the threshold value.

10. The method of treating accumulated water as claimed in claim 9, further comprising the step of adjusting an equalization value of an input sound received by the second microphone based on a difference between the second audio file and a second preset audio file when the difference between the second audio file obtained by the second microphone and the second preset audio file is greater than a threshold value.

11. The method of treating accumulated water as claimed in claim 10, further comprising the step of controlling the speaker to broadcast the first audio file and controlling the second microphone to record so as to establish the second preset audio file when the camera is in a non-accumulated water state.

12. The method of treating accumulated water as claimed in claim 8, further comprising the step of controlling the speaker to broadcast the first audio file and controlling the first microphone to record so as to establish the first preset audio file when the camera is in a non-accumulated water state.

13. The method of treating accumulated water as claimed in claim 8, wherein, in the step of generating the first audio file, a low-frequency audio file is generated.

14. A method of treating accumulated water, used for a camera, the method comprising the following steps:

generating a first audio file to be broadcasted from a speaker;

receiving the first audio file by a first microphone to obtain a second audio file, wherein the first microphone is arranged on a side of the main body different from that of the speaker;

determining a difference between the second audio file and a first preset audio file, wherein the first preset audio file is the first audio file received by the first microphone in a non-accumulated water state;

controlling a second microphone to receive the first audio file to obtain a third audio file when the difference between the second audio file and the first preset audio file is less than a threshold, wherein the second microphone is arranged on a side of the main body different from that of the first microphone; and determining a difference between the third audio file and a second preset audio file;

wherein the second preset audio file is the first audio file received by the second microphone in the non-accumulated water state; and when the difference between the second audio file received by the first microphone or second microphone and the first preset audio file, or when the difference between the third audio file received by the second microphone and the second preset audio file exceeds the threshold, broadcasting the first audio file by the speaker so as to cause vibrations which eliminate the accumulated water.

15. The method of treating accumulated water as claimed in claim 14, further comprising the step of controlling the speaker to stop broadcasting the first audio file when the difference between the third audio file and the second preset audio file is less than a threshold value.

16. The method of treating accumulated water as claimed in claim 14, further comprising the step of adjusting an equalization value of an output sound broadcasted from the speaker based on a difference between the second audio file and the first preset audio file when the difference between the second audio file obtained by the first microphone and the first preset audio file is greater than the threshold value.

17. The method of treating accumulated water as claimed in claim 16, further comprising the step of adjusting an equalization value of an input sound received by the second microphone based on the difference between the third audio file and the second preset audio file when the difference between the third audio file obtained by the second microphone and the second preset audio file is greater than the threshold value.

18. The method of treating accumulated water as claimed in claim 17, further comprising the step of controlling the speaker to broadcast the first audio file and controlling the second microphone to record so as to establish the second preset audio file when the camera is in a non-accumulated water state.

19. The method of treating accumulated water as claimed in claim 14, further comprising the step of controlling the speaker to broadcast the first audio file and controlling the first microphone to record so as to establish the first preset audio file when the camera is in the non-accumulated water state.

20. The method of treating accumulated water as claimed in claim 14, wherein, in the step of generating the first audio file, a low-frequency audio file is generated.

* * * * *